US012586299B2

(12) United States Patent
Yang et al.

(10) Patent No.: US 12,586,299 B2
(45) Date of Patent: Mar. 24, 2026

(54) REAL WORLD OBJECT RECONSTRUCTION AND REPRESENTATION

(71) Applicant: WAABI Innovation Inc., Toronto (CA)

(72) Inventors: Ze Yang, Toronto (CA); Sivabalan Manivasagam, Toronto (CA); Yun Chen, Toronto (CA); Jingkang Wang, Toronto (CA); Raquel Urtasun, Toronto (CA)

(73) Assignee: WAABI Canada Inc., Toronto (CA)

( * ) Notice: Subject to any disclaimer, the term of this patent is extended or adjusted under 35 U.S.C. 154(b) by 398 days.

(21) Appl. No.: 18/182,491

(22) Filed: Mar. 13, 2023

(65) Prior Publication Data

US 2023/0298263 A1 Sep. 21, 2023

Related U.S. Application Data

(60) Provisional application No. 63/320,777, filed on Mar. 17, 2022.

(51) Int. Cl.
| | |
|---|---|
| *G06T 15/50* | (2011.01) |
| *G06T 7/50* | (2017.01) |
| *G06T 7/70* | (2017.01) |

(52) U.S. Cl.
CPC ............. *G06T 15/506* (2013.01); *G06T 7/50* (2017.01); *G06T 7/70* (2017.01)

(58) Field of Classification Search
CPC .......... G06T 15/506; G06T 7/50; G06T 7/70; G06T 15/06; G01C 21/1652; G01S 17/88
See application file for complete search history.

(56) References Cited

PUBLICATIONS

J. Gallego and P. Bertolino, "Foreground object segmentation for moving camera sequences based on foreground-background probabilistic models and prior probability maps," 2014 IEEE International Conference on Image Processing (ICIP), Paris, France, 2014, pp. 3312-3316, doi: 10.1109/ICIP.2014.7025670. (Year: 2014).*
T. Hanke et al., "Generation and validation of virtual point cloud data for automated driving systems," 2017 IEEE 20th International Conference on Intelligent Transportation Systems (ITSC), Yokohama, Japan, 2017, pp. 1-6, doi: 10.1109/ITSC.2017.8317864. (Year: 2017).*

(Continued)

*Primary Examiner* — Matthew C Bella
*Assistant Examiner* — Janice E. Vaz
(74) *Attorney, Agent, or Firm* — Lathrop GPM LLP

(57) ABSTRACT

Real world object reconstruction and representation include performing operations that include sampling locations along a camera ray from a virtual camera to a target object to obtain a sample set of the locations along the camera ray. For each location of the at least a subset of the sample set, the operations include determining a position of the location with respect to the target object, executing, based on the position, a reflectance multilayer perceptron (MLP) model, to determine an albedo and material shininess for the location, and computing a radiance for the location and based on a viewing direction of the camera ray using the albedo and the material shininess. The operations further includes rendering a color value for the camera ray by compositing the radiance across the first sample set.

18 Claims, 9 Drawing Sheets

(56)     References Cited

PUBLICATIONS

Zhang, J. Y., et al., "NeRS: Neural Reflectance Surfaces for Sparse-view 3D Reconstruction in the Wild", Oct. 18, 2021, 18 pages (Year: 2021).*

Rumelhart, D. E., et al., "Learning Internal Representations by Error Propagation", Jan. 1, 1987, 23 pages.

Mildenhall, B., et al, "NeRF: Representing Scenes as Neural Radiance Fields for View Synthesis", Aug. 3, 2020, 25 pages.

Zhang, K., et al., "NeRF ++: Analyzing and Improving Neural Radiance Fields", Oct. 21, 2020, 9 pages.

Zhang, J. Y., et al., "NeRS: Neural Reflectance Surfaces for Sparse-view 3D Reconstruction in the Wild", Oct. 18, 2021, 18 pages.

Wang, P., et al., "NeuS: Learning Neural Implicit Surfaces by Volume Rendering for Multi-view Reconstruction", Jun. 20, 2021, 22 pages.

Oechsle, M., et al., "UNISURF: Unifying Neural Implicit Surfaces and Radiance Fields for Multi-View Reconstruction", Apr. 20, 2021, 11 pages.

* cited by examiner

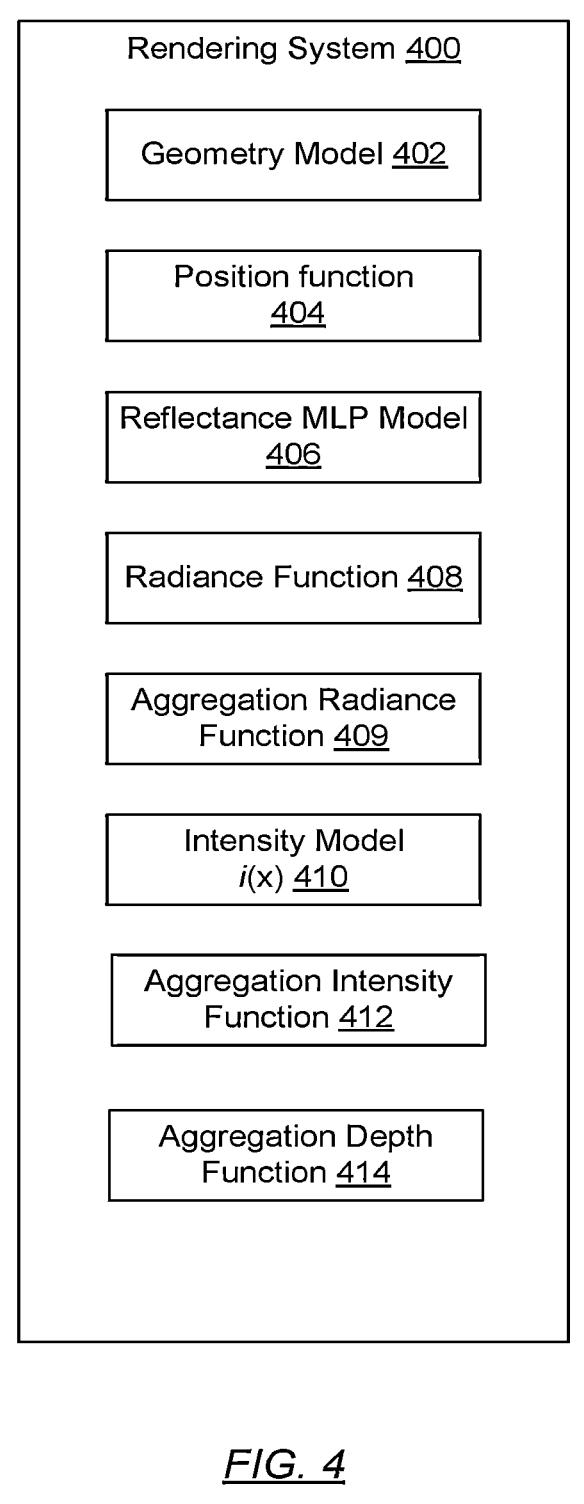

Rendering System 400

Geometry Model 402

Position function
404

Reflectance MLP Model
406

Radiance Function 408

Aggregation Radiance
Function 409

Intensity Model
$i$(x) 410

Aggregation Intensity
Function 412

Aggregation Depth
Function 414

*FIG. 4*

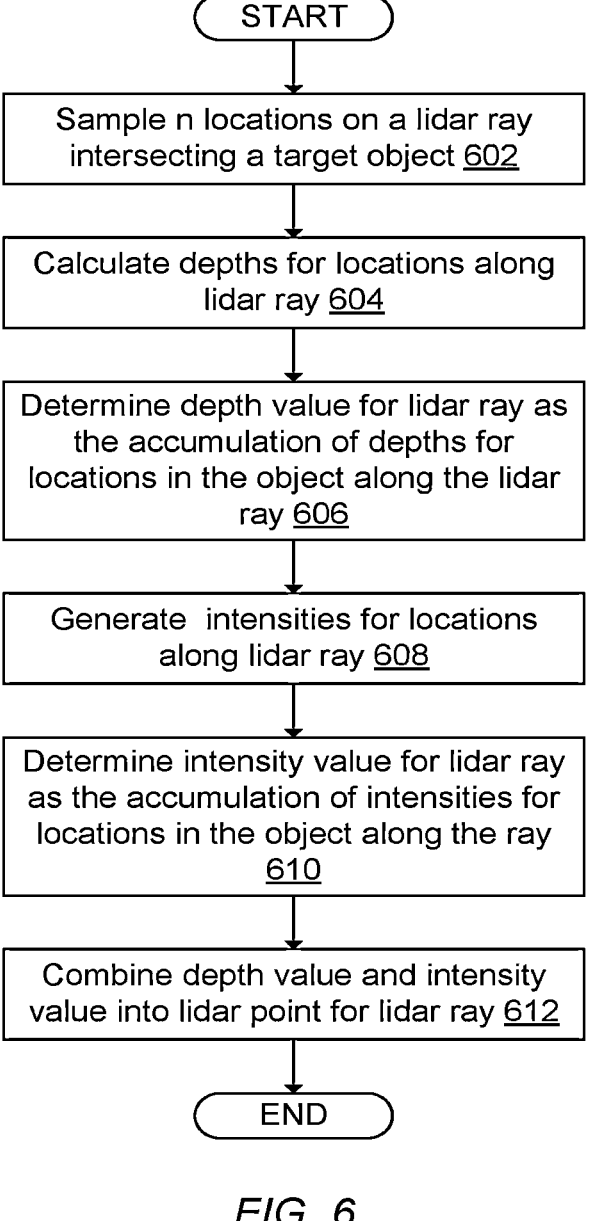

Sample n locations on a lidar ray intersecting a target object 602

Calculate depths for locations along lidar ray 604

Determine depth value for lidar ray as the accumulation of depths for locations in the object along the lidar ray 606

Generate intensities for locations along lidar ray 608

Determine intensity value for lidar ray as the accumulation of intensities for locations in the object along the ray 610

Combine depth value and intensity value into lidar point for lidar ray 612

END

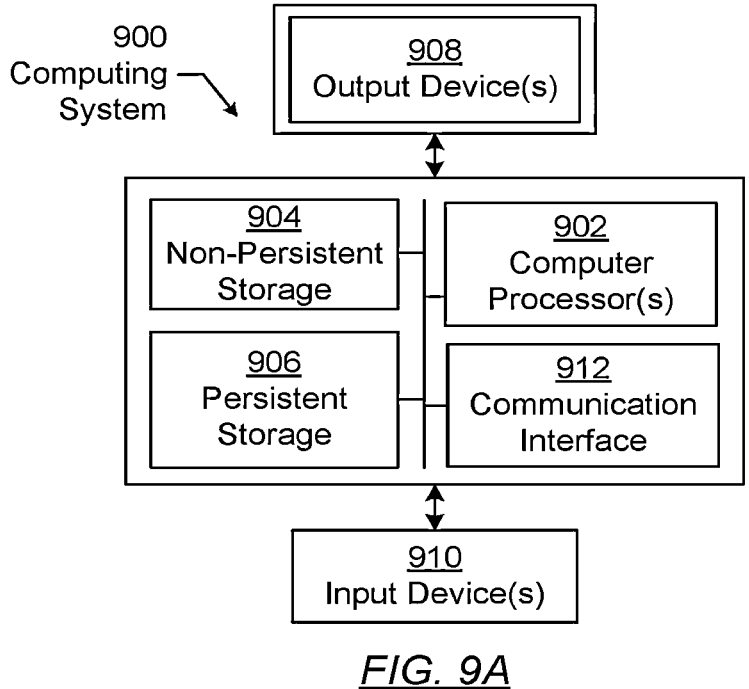
900
Computing
System
_FIG. 9A_
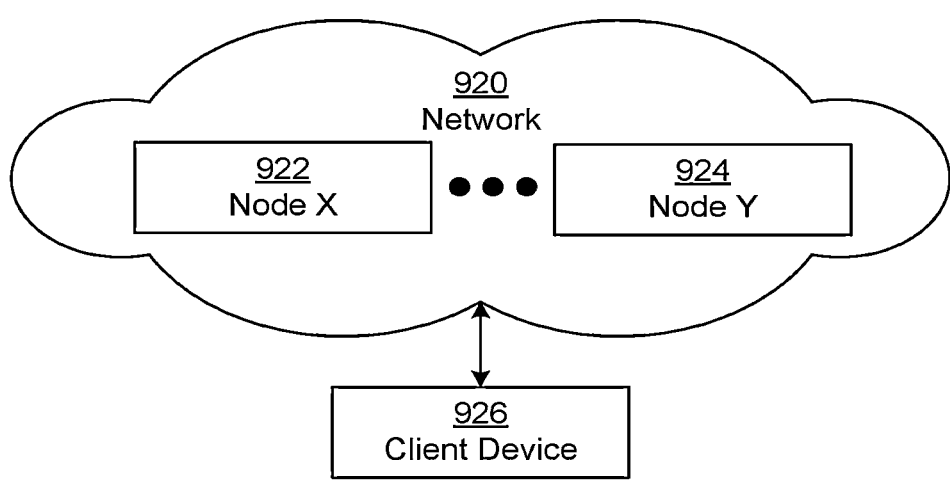
_FIG. 9B_

REAL WORLD OBJECT RECONSTRUCTION AND REPRESENTATION

CROSS-REFERENCE TO RELATED APPLICATIONS

This application is a non-provisional application of, and thereby claims benefit to U.S. patent application Ser. No. 63/320,777 filed on Mar. 17, 2022, which is incorporated herein by reference in its entirety.

BACKGROUND

A virtual world is a computer-simulated environment, which enable a player to interact in a three dimensional space as if the player were in the real world. In some cases, the virtual world is designed to replicate at least some aspects of the real world. For example, the virtual world may include one or more objects reconstructed from the real world. Reconstructing objects from the real world to represent in the virtual world brings realism, diversity and scale to virtual worlds.

SUMMARY

In general, in one aspect, one or more embodiments relate to a method that includes sampling locations along a camera ray from a virtual camera to a target object to obtain a sample set of the locations along the camera ray. For each location of the at least a subset of the sample set, the method includes determining a position of the location with respect to the target object, executing, based on the position, a reflectance multilayer perceptron (MLP) model, to determine an albedo and material shininess for the location, and computing a radiance for the location and based on a viewing direction of the camera ray using the albedo and the material shininess. The method further includes rendering a color value for the camera ray by compositing the radiance across the first sample set.

In general, in one aspect, one or more embodiments relate to a system that includes memory and a computer processor that include computer readable program code for performing operations. The operations include sampling locations along a camera ray from a virtual camera to a target object to obtain a sample set of the locations along the camera ray. For each location of the at least a subset of the sample set, the operations include determining a position of the location with respect to the target object, executing, based on the position, a reflectance multilayer perceptron (MLP) model, to determine an albedo and material shininess for the location, and computing a radiance for the location and based on a viewing direction of the camera ray using the albedo and the material shininess. The operations further includes rendering a color value for the camera ray by compositing the radiance across the first sample set.

In general, in one aspect, one or more embodiments relate to a non-transitory computer readable medium that includes computer readable program code for performing operations. The operations include sampling locations along a camera ray from a virtual camera to a target object to obtain a sample set of the locations along the camera ray. For each location of the at least a subset of the sample set, the operations include determining a position of the location with respect to the target object, executing, based on the position, a reflectance multilayer perceptron (MLP) model, to determine an albedo and material shininess for the location, and computing a radiance for the location and based on a viewing direction of the camera ray using the albedo and the material shininess. The operations further includes rendering a color value for the camera ray by compositing the radiance across the first sample set.

Other aspects of the invention will be apparent from the following description and the appended claims.

BRIEF DESCRIPTION OF DRAWINGS

FIG. 4 shows a diagram of a rendering system in accordance with one or more embodiments.

FIG. 6 shows a flowchart for generating a lidar point in accordance with one or more embodiments.

FIGS. 9A and 9B show a computing system in accordance with one or more embodiments of the invention.

Like elements in the various figures are denoted by like reference numerals for consistency.

DETAILED DESCRIPTION

Figure 1:
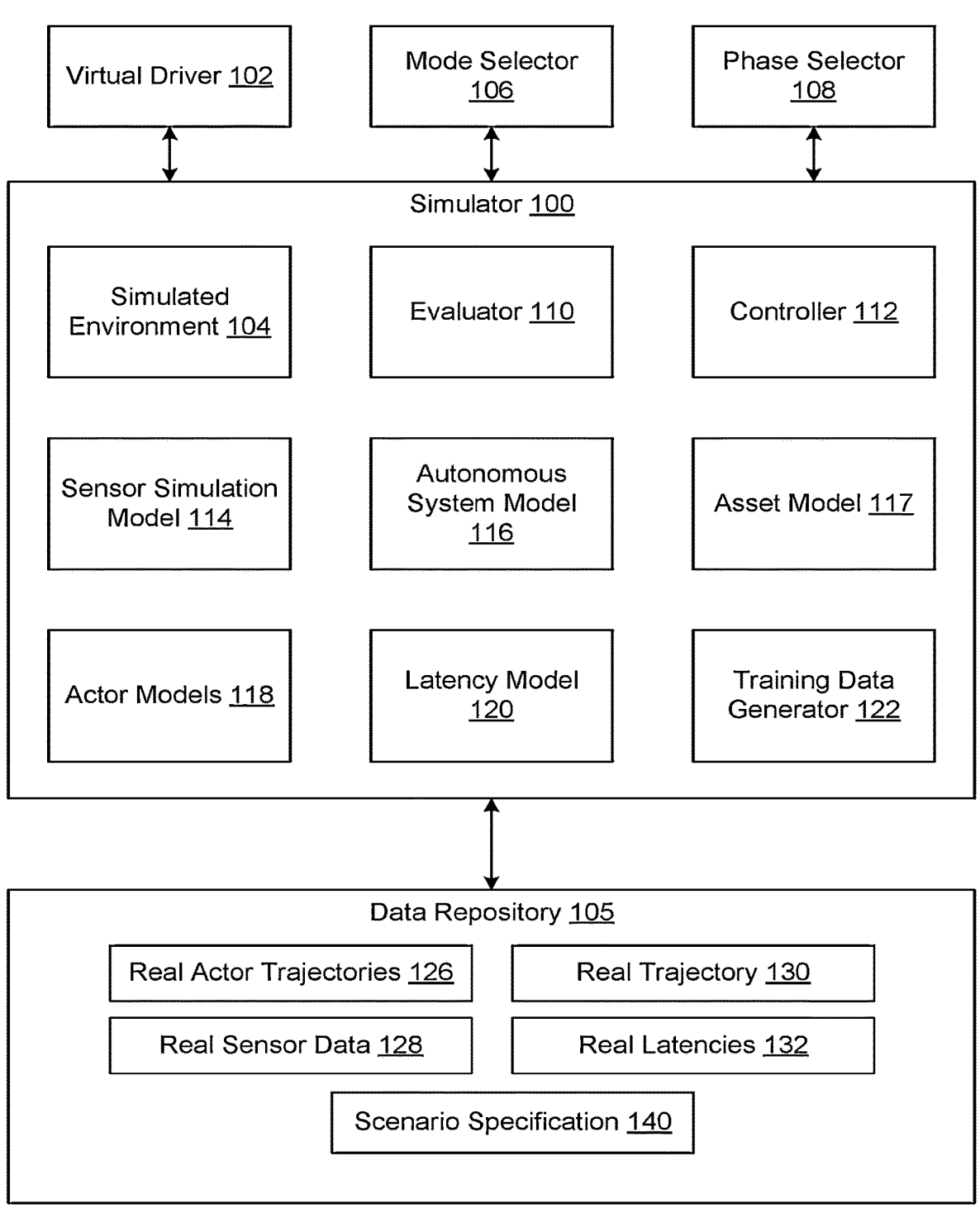
FIG. 1 shows a diagram of an autonomous training and testing system in accordance with one or more embodiments.

In general, embodiments are directed to target object reconstruction in a virtual world. Target object reconstruction is rendering a virtual version of a real world object in the virtual world. For a particular virtual sensor location (e.g., virtual camera, virtual lidar sensor), ray tracing is performed to simulate the effect of sensor input (e.g., light, lidar) on the target object. Each ray has a first endpoint at the virtual sensor and a second endpoint in the virtual world according to the view of the virtual sensor. For virtual sensors that are virtual cameras, the rays are referred to as camera rays. For virtual sensors that are virtual lidar sensors, the rays are referred to as lidar rays. By having rays spanning the view of the virtual sensor, a scene is reconstructed. Namely, the collection of rays simulates the player's view in the real world such that the player should have a same input as if the player were in a real world.

One or more embodiments generate, for each ray to the target object being reconstructed, sensor input for the ray. To simulate sensor input for a camera, the multiple locations along a camera ray from the virtual camera to the target object is sampled. For each sampled location, the position of the location is determined. The position indicates whether the location is near background (i.e., between the virtual object and the virtual camera), a foreground (i.e., within or near the surface of the target object), or far background (i.e., behind the virtual object). Based on the position, a reflectance multilayer perceptron (MLP) model is queried, to determine an albedo and material shininess for the location. The reflectance MLP model is dependent on the position. Using the albedo and material shininess for the location, the radiance for the location is determined based on viewing direction. Across the locations, the radiances are combined into a color value for the ray. The color value is the sensor output for the camera. Namely, the color value is the output of the camera given the simulations of the input to the camera. The color value is part of the sensor input to the player that is the sensor output from the camera. Across the camera rays, the color values provide a camera view of the virtual world.

To simulate sensor input from a lidar sensor, lidar rays are generated based on the configuration of the lidar intrinsics. For each ray, a determination is made whether the ray intersects with the target object bounding box (using a ray-box intersection algorithm). Further, locations along lidar rays intersecting the target object is sampled to render color or the lidar point value. Depths from the sensor to each location is calculated and combined to generate a depth value for the lidar ray. Intensities for the locations along the lidar ray are generated using an MLP model. The intensities are combined to generate an intensity value for the lidar ray. The depth value and the intensity value are combined to generate a lidar point for the lidar ray. Thus, over the combination of lidar rays, one or more embodiments generate a lidar point cloud for a lidar sensor.

The object reconstruction of a target object may be performed as part of generating a simulated environment for training and testing of autonomous systems. An autonomous system is a self-driving mode of transportation that does not require a human pilot or human driver to move and react to the real-world environment. Rather, the autonomous system includes a virtual driver that is the decision making portion of the autonomous system. The virtual driver is an artificial intelligence system that learns how to interact in the real world. The autonomous system may be completely autonomous or semi-autonomous. As a mode of transportation, the autonomous system is contained in a housing configured to move through a real-world environment. Examples of autonomous systems include self-driving vehicles (e.g., self-driving trucks and cars), drones, airplanes, robots, etc. The virtual driver is the software that makes decisions and causes the autonomous system to interact with the real-world including moving, signaling, and stopping or maintaining a current state.

The real world environment is the portion of the real world through which the autonomous system, when trained, is designed to move. Thus, the real world environment may include interactions with concrete and land, people, animals, other autonomous systems, and human driven systems, construction, and other objects as the autonomous system moves from an origin to a destination. In order to interact with the real-world environment, the autonomous system includes various types of sensors, such as LiDAR sensors amongst other types, which are used to obtain measurements of the real-world environment and cameras that capture images from the real world environment.

The testing and training of virtual driver of the autonomous systems in the real-world environment is unsafe because of the accidents that an untrained virtual driver can cause. Thus, as shown in FIG. 1, a simulator (100) is configured to train and test a virtual driver (102) of an autonomous system. For example, the simulator may be a unified, modular, mixed-reality, closed-loop simulator for autonomous systems. The simulator (100) is a configurable simulation framework that enables not only evaluation of different autonomy components in isolation, but also as a complete system in a closed-loop manner. The simulator reconstructs "digital twins" of real world scenarios automatically, enabling accurate evaluation of the virtual driver at scale. The simulator (100) may also be configured to perform mixed-reality simulation that combines real world data and simulated data to create diverse and realistic evaluation variations to provide insight into the virtual driver's performance. The mixed reality closed-loop simulation allows the simulator (100) to analyze the virtual driver's action on counterfactual "what-if" scenarios that did not occur in the real-world. The simulator (100) further includes functionality to simulate and train on rare yet safety-critical scenarios with respect to the entire autonomous system and closed-loop training to enable automatic and scalable improvement of autonomy.

The simulator (100) creates the simulated environment (104) that is a virtual world in which the virtual driver (102) is the player in the virtual world. The simulated environment (104) is a simulation of a real-world environment, which may or may not be in actual existence, in which the autonomous system is designed to move. As such, the simulated environment (104) includes a simulation of the objects (i.e., simulated objects or assets) and background in the real world, including the natural objects, construction, buildings and roads, obstacles, as well as other autonomous and non-autonomous objects. The simulated environment simulates the environmental conditions within which the autonomous system may be deployed. Additionally, the simulated environment (104) may be configured to simulate various weather conditions that may affect the inputs to the autonomous systems. The simulated objects may include both stationary and non-stationary objects. Non-stationary objects are actors in the real-world environment.

The simulator (100) also includes an evaluator (110). The evaluator (110) is configured to train and test the virtual driver (102) by creating various scenarios the simulated environment. Each scenario is a configuration of the simulated environment including, but not limited to, static portions, movement of simulated objects, actions of the simulated objects with each other and reactions to actions taken by the autonomous system and simulated objects. The evaluator (110) is further configured to evaluate the performance of the virtual driver using a variety of metrics.

The evaluator (110) assesses the performance of the virtual driver throughout the performance of the scenario. Assessing the performance may include applying rules. For example, the rules may be that the automated system does not collide with any other actor, compliance with safety and comfort standards (e.g., passengers not experiencing more than a certain acceleration force within the vehicle), the automated system not deviating from executed trajectory), or other rule. Each rule may be associated with the metric information that relates a degree of breaking the rule with a corresponding score. The evaluator (110) may be implemented as a data-driven neural network that learns to distinguish between good and bad driving behavior. The various metrics of the evaluation system may be leveraged to determine whether the automated system satisfies the requirements of success criterion for a particular scenario. Further, in addition to system level performance, for modular based virtual drivers, the evaluator may also evaluate individual modules such as segmentation or prediction performance for actors in the scene with respect to the ground truth recorded in the simulator.

The simulator (100) is configured to operate in multiple phases as selected by the phase selector (108) and modes as selected by a mode selector (106). The phase selector (108) and mode selector (106) may be a graphical user interface or application programming interface component that is configured to receive a selection of phase and mode, respectively. The selected phase and mode define the configuration of the simulator (100). Namely, the selected phase and mode define which system components communicate and the operations of the system components.

The phase may be selected using a phase selector (108). The phase may be training phase or testing phase. In the training phase, the evaluator (110) provides metric information to the virtual driver (102), which uses the metric information to update the virtual driver (102). The evaluator (110) may further use the metric information to further train the virtual driver (102) by generating scenarios for the virtual driver. In the testing phase, the evaluator (110) does not provide the metric information to the virtual driver. In the testing phase, the evaluator (110) uses the metric information to assess the virtual driver and to develop scenarios for the virtual driver (102).

The mode may be selected by the mode selector (106). The mode defines the degree to which real-world data is used, whether noise is injected into simulated data, degree of perturbations of real world data, and whether the scenarios are designed to be adversarial. Example modes include open loop simulation mode, closed loop simulation mode, single module closed loop simulation mode, fuzzy mode, and adversarial mode. In an open loop simulation mode, the virtual driver is evaluated with real world data. In a single module closed loop simulation mode, a single module of the virtual driver is tested. An example of a single module closed loop simulation mode is a localizer closed loop simulation mode in which the simulator evaluates how the localizer estimated pose drifts over time as the scenario progresses in simulation. In a training data simulation mode, simulator is used to generate training data. In a closed loop evaluation mode, the virtual driver and simulation system are executed together to evaluate system performance. In the adversarial mode, the actors are modified to perform adversarial. In the fuzzy mode, noise is injected into the scenario (e.g., to replicate signal processing noise and other types of noise). Other modes may exist without departing from the scope of the system.

The simulator (100) includes the controller (112) that includes functionality to configure the various components of the simulator (100) according to the selected mode and phase. Namely, the controller (112) may modify the configuration of the each of the components of the simulator based on configuration parameters of the simulator (100). Such components include the evaluator (110), the simulated environment (104), an autonomous system model (116), sensor simulation models (114), asset models (117), actor models (118), latency models (120), and a training data generator (122).

The autonomous system model (116) is a detailed model of the autonomous system in which the virtual driver will execute. The autonomous system model (116) includes model, geometry, physical parameters (e.g., mass distribution, points of significance), engine parameters, sensor locations and type, firing pattern of the sensors, information about the hardware on which the virtual driver executes (e.g., processor power, amount of memory, and other hardware information), and other information about the autonomous system. The various parameters of the autonomous system model may be configurable by the user or another system.

For example, if the autonomous system is a motor vehicle, the modeling and dynamics may include the type of vehicle (e.g., car, truck), make and model, geometry, physical parameters such as the mass distribution, axle positions, type and performance of engine, etc. The vehicle model may also include information about the sensors on the vehicle (e.g., camera, LiDAR, etc.), the sensors' relative firing synchro-nization pattern, and the sensors' calibrated extrinsics (e.g., position and orientation) and intrinsics (e.g., focal length). The vehicle model also defines the onboard computer hardware, sensor drivers, controllers, and the autonomy software release under test.

The autonomous system model includes an autonomous system dynamic model. The autonomous system dynamic model is used for dynamics simulation that takes the actuation actions of the virtual driver (e.g., steering angle, desired acceleration) and enacts the actuation actions on the autonomous system in the simulated environment to update the simulated environment and the state of the autonomous system. To update the state, a kinematic motion model may be used, or a dynamics motion model that accounts for the forces applied to the vehicle may be used to determine the state. Within the simulator, with access to real log scenarios with ground truth actuations and vehicle states at each time step, embodiments may also optimize analytical vehicle model parameters or learn parameters of a neural network that infers the new state of the autonomous system given the virtual driver outputs.

In one or more embodiments, the sensor simulation models (114) models, in the simulated environment, active and passive sensor inputs. Passive sensor inputs capture the visual appearance of the simulated environment including stationary and nonstationary simulated objects from the perspective of one or more cameras based on the simulated position of the camera(s) within the simulated environment. Example of passive sensor inputs include inertial measurement unit (IMU) and thermal. Active sensor inputs are inputs to the virtual driver of the autonomous system from the active sensors, such as LiDAR, RADAR, global positioning system (GPS), ultrasound, etc. Namely, the active sensor inputs include the measurements taken by the sensors, the measurements being simulated based on the simulated environment based on the simulated position of the sensor(s) within the simulated environment. By way of an example, the active sensor measurements may be measurements that a LiDAR sensor would make of the simulated environment over time and in relation to the movement of the autonomous system. In one or more embodiments, all or a portion of the sensor simulation models (114) may be or include the rendering system (400) shown in FIG. 4. In such a scenario, the rendering system of the sensor simulation models (114) may perform the operations of FIGS. 5 and 6 and be trained by the operations of FIG. 7.

The sensor simulation models (114) are configured to simulates the sensor observations of the surrounding scene in the simulated environment (104) at each time step according to the sensor configuration on the vehicle platform. When the simulated environment directly represents the real world environment, without modification, the sensor output may be directly fed into the virtual driver. For light-based sensors, the sensor model simulates light as rays that interact with objects in the scene to generate the sensor data. Depending on the asset representation (e.g., of stationary and nonstationary objects), embodiments may use graphics-based rendering for assets with textured meshes, neural rendering, or a combination of multiple rendering schemes. Leveraging multiple rendering schemes enables customizable world building with improved realism. Because assets are compositional in 3D and support a standard interface of render commands, different asset representations may be composed in a seamless manner to generate the final sensor data. Additionally, for scenarios that replay what happened in a real world and use the same autonomous system as in the real world, the original sensor observations may be replayed at each time step.

Asset models (117) includes multiple models, each model modeling a particular type of individual assets in the real world. The assets may include inanimate objects such as construction barriers or traffic signs, parked cars, and background (e.g., vegetation or sky). Each of the entities in a scenario may correspond to an individual asset. As such, an asset model, or instance of a type of asset model, may exist for each of the entities or assets in the scenario. The assets can be composed together to form the three dimensional simulated environment. An asset model provides all the information needed by the simulator to simulate the asset. The asset model provides the information used by the simulator to represent and simulate the asset in the simulated environment. For example, an asset model may include geometry and bounding volume, the asset's interaction with light at various wavelengths of interest (e.g., visible for camera, infrared for LiDAR, microwave for RADAR), animation information describing deformation (e.g. rigging) or lighting changes (e.g., turn signals), material information such as friction for different surfaces, and metadata such as the asset's semantic class and key points of interest. Certain components of the asset may have different instantiations. For example, similar to rendering engines, an asset geometry may be defined in many ways, such as a mesh, voxels, point clouds, an analytical signed-distance function, or neural network. Asset models may be created either by artists, or reconstructed from real world sensor data, or optimized by an algorithm to be adversarial.

Closely related to, and possibly considered part of the set of asset models (117) are actor models (118). An actor model represents an actor in a scenario. An actor is a sentient being that has an independent decision making process. Namely, in a real world, the actor may be animate being (e.g., person or animal) that makes a decision based on an environment. The actor makes active movement rather than or in addition to passive movement. An actor model, or an instance of an actor model may exist for each actor in a scenario. The actor model is a model of the actor. If the actor is in a mode of transportation, then the actor model includes the model of transportation in which the actor is located. For example, actor models may represent pedestrians, children, vehicles being driven by drivers, pets, bicycles, and other types of actors.

The actor model leverages the scenario specification and assets to control all actors in the scene and their actions at each time step. The actor's behavior is modeled in a region of interest centered around the autonomous system. Depending on the scenario specification, the actor simulation will control the actors in the simulation to achieve the desired behavior. Actors can be controlled in various ways. One option is to leverage heuristic actor models, such as intelligent-driver model (IDM) that try to maintain a certain relative distance or time-to-collision (TTC) from a lead actor or heuristic-derived lane-change actor models. Another is to directly replay actor trajectories from a real log, or to control the actor(s) with a data-driven traffic model. Through the configurable design, embodiments may can mix and match different subsets of actors to be controlled by different behavior models. For example, far-away actors that initially may not interact with the autonomous system and can follow a real log trajectory, but when near the vicinity of the autonomous system may switch to a data-driven actor model. In another example, actors may be controlled by a heuristic or data-driven actor model that still conforms to the high-level route in a real-log. This mixed-reality simulation provides control and realism.

Further, actor models may be configured to be in cooperative or adversarial mode. In cooperative mode, the actor model models actors to act rationally in response to the state of the simulated environment. In adversarial mode, the actor model may model actors acting irrationally, such as exhibiting road rage and bad driving.

The latency model (120) represents timing latency that occurs when the autonomous system is in the real world environment. Several sources of timing latency may exist. For example, a latency may exist from the time that an event occurs to the sensors detecting the sensor information from the event and sending the sensor information to the virtual driver. Another latency may exist based on the difference between the computing hardware executing the virtual driver in the simulated environment as compared to the computing hardware of the virtual driver. Further, another timing latency may exist between the time that the virtual driver transmits an actuation signal to the autonomous system changing (e.g., direction or speed) based on the actuation signal. The latency model (120) models the various sources of timing latency.

Stated another way, in the real world, safety-critical decisions in the real world may involve fractions of a second affecting response time. The latency model simulates the exact timings and latency of different components of the onboard system. To enable scalable evaluation without strict requirement on exact hardware, the latencies and timings of the different components of autonomous system and sensor modules are modeled while running on different computer hardware. The latency model may replay latencies recorded from previously collected real world data or have a data-driven neural network that infers latencies at each time step to match the hardware in loop simulation setup.

The training data generator (122) is configured to generate training data. For example, the training data generator (122) may modify real-world scenarios to create new scenarios. The modification of real-world scenarios is referred to as mixed reality. For example, mixed-reality simulation may involve adding in new actors with novel behaviors, changing the behavior of one or more of the actors from the real-world, and modifying the sensor data in that region while keeping the remainder of the sensor data the same as the original log. In some cases, the training data generator (122) converts a benign scenario into a safety-critical scenario.

The simulator (100) is connected to a data repository (105). The data repository (105) is any type of storage unit or device that is configured to store data. The data repository (105) includes data gathered from the real world. For example, the data gathered from the real world include real actor trajectories (126), real sensor data (128), real trajectory of the system capturing the real world (130), and real latencies (132). Each of the real actor trajectories (126), real sensor data (128), real trajectory of the system capturing the real world (130), and real latencies (132) is data captured by or calculated directly from one or more sensors from the real world (e.g., in a real world log). In other words, the data gathered from the real-world are actual events that happened in real life. For example, in the case that the autonomous system is a vehicle, the real world data may be captured by a vehicle driving in the real world with sensor equipment.

Further, the data repository (105) includes functionality to store one or more scenario specifications (140). A scenario specification (140) specifies a scenario and evaluation setting for testing or training the autonomous system. For example, the scenario specification (140) may describe the initial state of the scene, such as the current state of autonomous system (e.g., the full 6D pose, velocity and acceleration), the map information specifying the road layout, and the scene layout specifying the initial state of all the dynamic actors and objects in the scenario. The scenario specification may also include dynamic actor information describing how the dynamic actors in the scenario should evolve over time which are inputs to the actor models. The dynamic actor information may include route information for the actors, desired behaviors or aggressiveness. The scenario specification (140) may be specified by a user, programmatically generated using a domain-specification-language (DSL), procedurally generated with heuristics from a data-driven algorithm, or adversarial. The scenario specification (140) can also be conditioned on data collected from a real world log, such as taking place on a specific real world map or having a subset of actors defined by their original locations and trajectories.

The interfaces between virtual driver and the simulator match the interfaces between the virtual driver and the autonomous system in the real world. For example, the sensor simulation model (114) and the virtual driver matches the virtual driver interacting with the sensors in the real world. The virtual driver is the actual autonomy software that executes on the autonomous system. The simulated sensor data that is output by the sensor simulation model (114) may be in or converted to the exact message format that the virtual driver takes as input as if the virtual driver were in the real world, and the virtual driver can then run as a black box virtual driver with the simulated latencies incorporated for components that run sequentially. The virtual driver then outputs the exact same control representation that it uses to interface with the low-level controller on the real autonomous system. The autonomous system model (116) will then update the state of the autonomous system in the simulated environment. Thus, the various simulation models of the simulator (100) run in parallel asynchronously at their own frequencies to match the real world setting.

Figure 2:
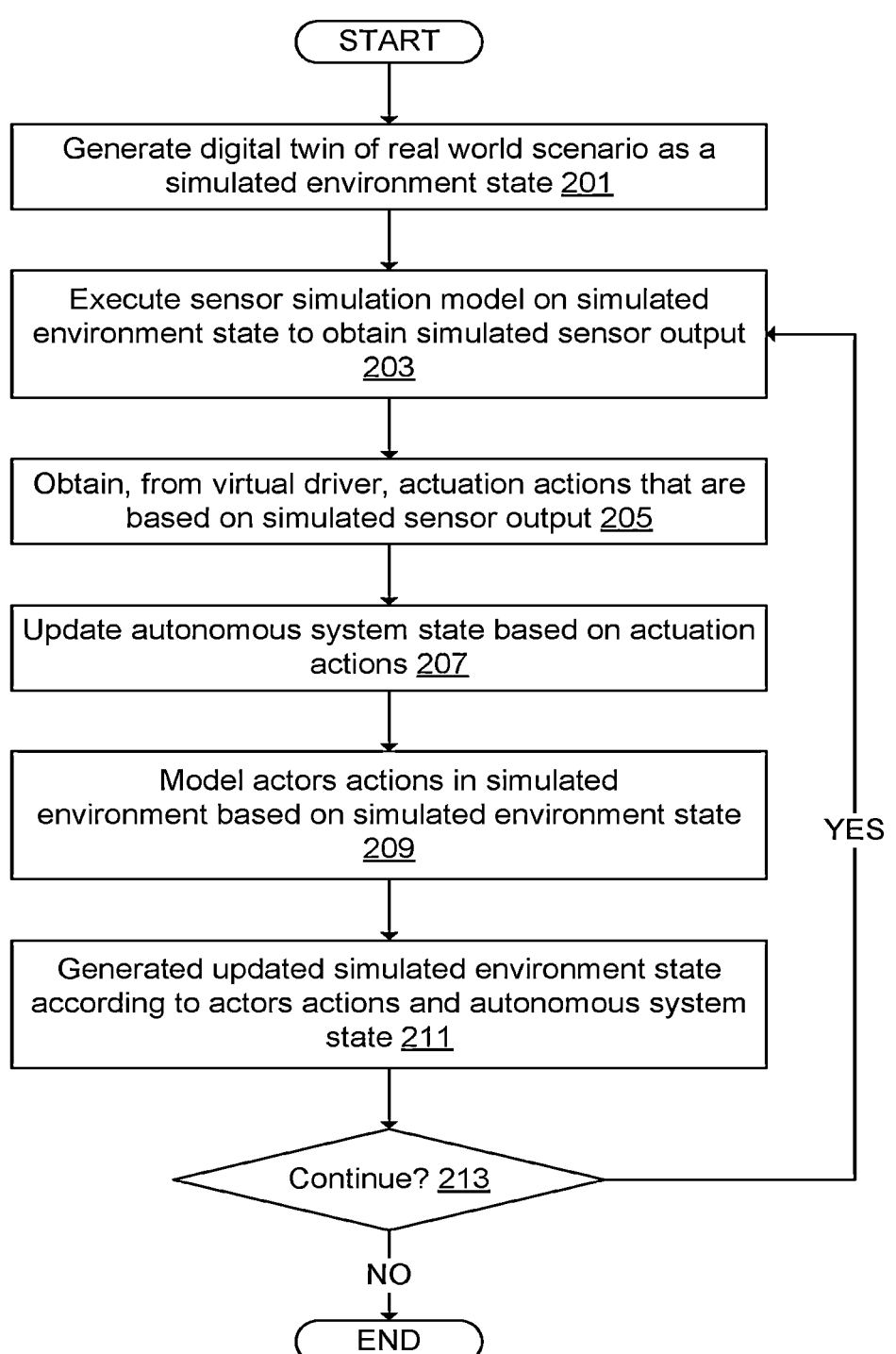
FIG. 2 shows a flowchart of the autonomous training and testing system in accordance with one or more embodiments.

FIG. 2 shows a flow diagram for executing the simulator in a closed loop mode. In Block 201, a digital twin of a real world scenario is generated as a simulated environment state. Log data from the real world is used to generate an initial virtual world. The log data defines which asset and actor models are used in an initial positioning of assets. For example, using convolutional neural networks on the log data, the various asset types within the real world may be identified. As other examples, offline perception systems and human annotations of log data may be used to identify asset types. Accordingly, corresponding asset and actor modes may be identified based on the asset types and add to the positions of the real actors and assets in the real world. Thus, the asset and actor models to create an initial three dimensional virtual world.

Figure 5:
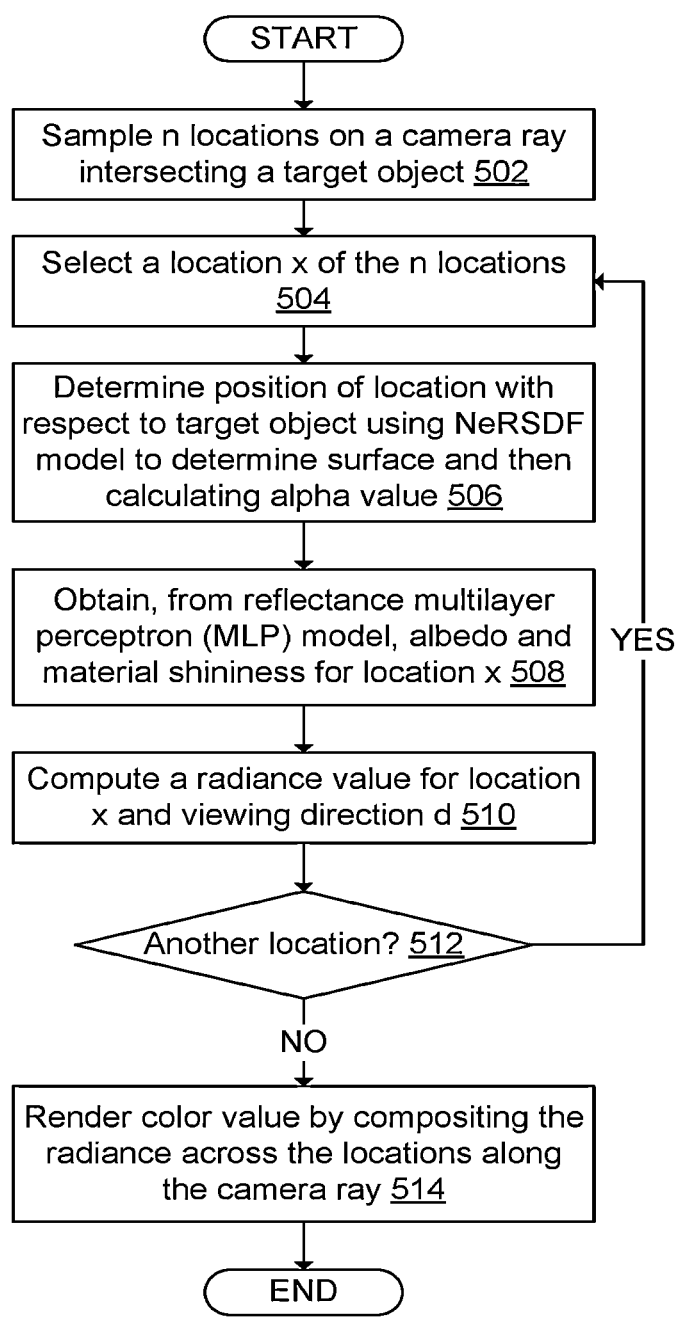
FIG. 5 shows a flowchart for generating a color value in accordance with one or more embodiments.

In Block 203, the sensor simulation model is executed on the simulated environment state to obtain simulated sensor output. The sensor simulation model may use beamforming and other techniques to replicate the view to the sensors of the autonomous system. Each sensor of the autonomous system has a corresponding sensor simulation model and a corresponding system. The sensor simulation model executes based on the position of the sensor within the virtual environment and generates simulated sensor output. The simulated sensor output is in the same form as would be received from a real sensor by the virtual driver. In one or more embodiments, Block 203 may be performed as shown in FIGS. 5 and 6 (described below) to generate camera output and lidar sensor output, respectively, for a virtual camera and a virtual lidar sensor, respectively. The operations of FIGS. 5 and 6 may be performed for each camera and lidar sensor on the autonomous system to simulate the output of the corresponding camera and lidar sensor. Location and viewing direction of the sensor with respect to the autonomous vehicle may be used to replicate originating location of the corresponding virtual sensor on the simulated autonomous system. Thus, the various sensor inputs to the virtual driver match the combination of inputs if the virtual driver were in the real world.

The simulated sensor output is passed to the virtual driver. In Block 205, the virtual drive executes based on the simulated sensor output to generate actuation actions. The actuation actions define how the virtual driver controls the autonomous system. For example, for an SDV, the actuation actions may be amount of acceleration, movement of the steering, triggering of a turn signal, etc. From the actuation actions, the autonomous system state in the simulated environment is updated in Block 207. The actuation actions are used as input to the autonomous system model to determine the actual actions of the autonomous system. For example, the autonomous system dynamic model may use the actuation actions in addition to road and weather conditions to represent the resulting movement of the autonomous system. For example, in a wet or snow environment, the same amount of acceleration action as in a dry environment may cause less acceleration than in the dry environment. As another example, the autonomous system model may account for possibly faulty tires (e.g., tire slippage), mechanical based latency, or other possible imperfections in the autonomous system.

In Block 209, actors' actions in the simulated environment are modeled based on the simulated environment state. Concurrently with the virtual driver model, the actor models and asset models are executed on the simulated environment state to determine an update for each of the assets and actors in the simulated environment. Here, the actors' actions may use the previous output of the evaluator to test the virtual driver. For example, if the actor is adversarial, the evaluator may indicate based on the previous action of the virtual driver, the lowest scoring metric of the virtual driver. Using a mapping of metrics to actions of the actor model, the actor model executes to exploit or test that particular metric.

Thus, in Block 211, the updated simulated environment state is updated according to the actors' actions and the autonomous system state. The updated simulated environment includes the change in positions of the actors and the autonomous system. Because the models execute independently of the real world, the update may reflect a deviation from the real world. Thus, the autonomous system is tested with new scenarios. In Block 213, a determination is made whether to continue. If the determination is made to continue, testing of the autonomous system continues using the updated simulated environment state in Block 203. At each iteration, during training, the evaluator provides feedback to the virtual driver. Thus, the parameters of the virtual driver are updated to improve performance of the virtual driver in a variety of scenarios. During testing, the evaluator is able to test using a variety of scenarios and patterns including edge cases that may be safety critical. Thus, one or more embodiments improve the virtual driver and increase safety of the virtual driver in the real world.

As shown, the virtual driver of the autonomous system acts based on the scenario and the current learned parameters of the virtual driver. The simulator obtains the actions of the autonomous system and provides a reaction in the simulated environment to the virtual driver of the autonomous system. The evaluator evaluates the performance of the virtual driver and creates scenarios based on the performance. The process may continue as the autonomous system operates in the simulated environment.

As discussed above, the object reconstruction to simulate sensor input may be performed based on ray casting. Ray casting creates multiple rays, each ray providing a corresponding point value of sensor input at the virtual sensor. By spanning, with different rays, the field of view of the virtual sensor, the entire scene as viewed by the virtual sensor is simulated.

Figure 3:
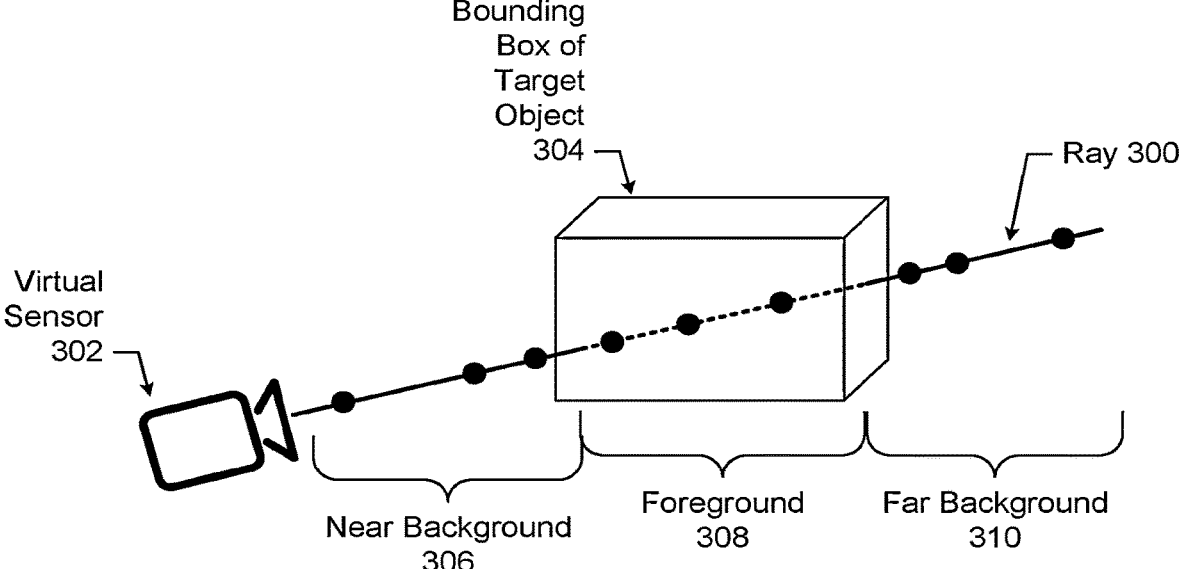
FIG. 3 shows a diagram of a ray in accordance with one or more embodiments.

FIG. 3 shows an example of a single ray (300) through a bounding box of a target object (304). The target object may be any object in a scene. For example, the target object may be an asset or actor of the autonomous system described above. In a gaming or other virtual world environment, the target object is any virtual object that is shown in the virtual world that is reconstructed, at least in part, from the real world. For object reconstruction, the ray has a first endpoint at the virtual sensor (302) and a second endpoint on an opposing side of a bounding box of the target object (304). The ray (300) passes through the target object. As such, the ray passes through at least a near point on the surface of the target object and a far point on the surface of the target object, which may be estimated by the bounding box of the target object (304). The near point is the point on the surface of the target object that is a location on the ray that is closest to the virtual sensor (302). The far point is the point on the surface of the target object that is a location on the ray that is farthest from the virtual sensor (302). If estimated by the bounding box of the target object, the surfaces of the target object that the near point and far point are located are actually the surfaces of the bounding box of the target object (304). In one or more embodiments, the bounding box of the target object is a minimum bounding box. Namely, the size of the bounding box is only as big to be a box that fits the target object.

Because the ray (300) is a line, an infinite number of locations are along the ray. One or more embodiments use a sampling technique to sample locations along the ray and determine values for each location. The values are accumulated to obtain a virtual sensor value for the ray (300).

Each sampled location has a corresponding position with respect to the target object. The position is a geographic classification of the location with respect to the target object. In one or more embodiments, the position is one of the classes of near background (306), foreground (308), and far background (310). Additional classes may exist that define the location with respect to the target object without departing from the scope of the claims. The near background (306) is the region between the target object and the virtual sensor (302). Namely, the near background (306) is the region from the virtual sensor to the near point. The foreground (308) is the surface of the target object and the region within target object. Stated another way, the foreground (308) is the region from the near point to the far point, inclusive. The far background (310) is the region that is farthest from the virtual sensor (302) starting at the far point of the target object. The far background (310) is thus the region from the far point to the opposing endpoint of the ray that is opposite of the virtual sensor.

FIG. 4 shows a diagram of the rendering system (400) in accordance with one or more embodiments. As shown in FIG. 4, the rendering system (400) is a system configured to reconstruct a target object. In particular, the rendering system (400) may be configured to render camera images and lidar images. The rendering system (400) includes a geometry model (402), a position function (404), a reflectance model (406), a radiance function (408), an intensity model (410), an aggregation intensity function (412), and the aggregation depth function (414).

The geometry model (402) reconstructs the geometry of the real world object that is the target object. Specifically, the geometry model (402) is a neural network model. In one or more embodiments, the geometry model (402) is a Neural Reflectance signed distance function (NeRSDF) model parameterized by an MLP surface model that models the surface of the target object.

Generally, an MLP model is a feedforward artificial neural network having at least three layers of nodes. The layers include an input layer, a hidden layer, and an output layer. Each layer has multiple nodes. Each node includes an activation function with learnable parameters. Through training and backpropagation of losses, the parameters are updated and correspondingly, the MLP model improves in making predictions.

The MLP surface model maps a point location to signed distance and then to a volume density. The MLP surface model is trained based on sensor data, such as by performing the operations of FIG. 7. The signed distance function of the NeRSDF model maps a location in three dimensional space to the location's signed distance from the object surface. The signed distance is a distance that may be positive, zero, or negative from the target object surface depending on the position of the location with respect to the object surface. In the signed distance, a positive value is outside the first surface of the object that the ray passes through, zero at surface of the object, negative inside the object, most negative at center of the object, less negative closer to second surface of the object, zero at second surface of the object that the ray passes through, and then positive outside the second surface that the object passes through.

Continuing with FIG. 4, the position function (404) maps the signed distance to an alpha value that has a value of zero or one. The alpha value is one if the location is inside the object and zero otherwise. For example, the position function may be the following function (eq. 1):

$$\alpha(x) = \frac{1}{1 + \exp(\beta \cdot s(x))} \qquad \text{eq. 1}$$

in eq. 1, alpha value $\alpha(x)$ is a function that takes, as input location x that should act like a step function at the target object's surface in order to evaluate to either zero or one. Thus, $\beta$ should go to infinity. However, to prevent the gradient from $\alpha(x)$ to the location signed distance model from vanishing during training, $\beta$ is set as a learnable parameter that is adjusted during training.

The reflectance MLP model (406) is an MLP model (as generally described above) that is configured to output the albedo and the material shininess. In one or more embodiments, the reflectance MLP model (406) includes an albedo MLP model and a material MLP model. Namely, the reflectance MLP model (406) may have at least two individual MLP models. The albedo MLP model calculates a diffuse albedo and a specular albedo for a location. Albedo is a portion of light that is reflected away from a surface. Diffuse albedo is the reflection of light in many directions while specular albedo is single directional. The material MLP model calculates a material shininess for the location. The material shininess is a property value that defines the breadth of the angle of the specular reflection.

Continuing with FIG. 4, the radiance function (408) is a function that calculates a radiance for a particular location based on the viewing direction. Namely, the radiance is the amount of light that is emitted from a particular location to the virtual sensor. The radiance function uses, as input, the albedo, material shininess, and a learnable lighting map. The learnable lighting map specifies the lighting environment (e.g., light sources and the propagation of light in a scene). In one or more embodiments, the radiance function is a phong model whose value is estimated using summations. For example, the radiance function may be the following function (eq. 2):

$$c(x, d) \approx a(x) \sum_{\omega} (\omega \cdot n) E_{\omega}) + a_s(x) \frac{\gamma(x) + 1}{2\pi} \sum_{\omega} (r_{\omega} \cdot d)^{\gamma(x)} E_{\omega}) \qquad \text{eq. 2}$$

In eq. 2, c(x, d) is the radiance at location x and viewing direction d. Further, a(x) is the diffuse albedo at location x, $a_s(x)$ is the specular albedo at location x, $E_{\omega}$ is the discrete incoming light, $\gamma(x)$ is the material shininess value, $r_{\omega}$ is the reflected light direction, n is the normal that is estimated as the gradient of the SDF function s(x) in eq. 1, and $\omega$ is incoming light radiance direction to the location.

The aggregation radiance function (409) aggregates the radiances along the sampled locations of the ray to compute a total radiance of the ray. In one or more embodiments, the aggregated radiance function is a weighted summation of the radiances, where each radiance is weighted by the alpha value described above and the accumulated transmission along the ray up to the location. The accumulated transmission is performed to account for light passing through near background objects, such as fog, but may not pass through opaque objects, such as a tree or car. The accumulated transmission is estimated by the alpha value. Thus, the greater the accumulated transmission along the ray up to the location, the less the location has in providing light to the virtual sensor. For example, the aggregated radiance function may be the following function (eq. 3):

$$C(r) = \sum_{i=1}^{N} \alpha(x_i) T(x_i) c(x_i, d) \qquad \text{eq. 3}$$

In eq. 3, $T(x_i)$ may be calculated using the following function (eq. 4):

$$T(x_i) = \prod_{j=1}^{i} (1 - \alpha(x_j)) \qquad \text{eq. 4}$$

In eq. 4, $\alpha(x_j)$ is the alpha value for location j as calculated in equation eq. 1.

Continuing with FIG. 4, the intensity model (410) is configured to calculate an intensity for a location. The intensity is the amount of lidar signal reflected back from the location. The intensity model (410) is an MLP network model. In one or more embodiments, the intensity model has at least a portion that is the same model as the material MLP model. Namely, the intensity model (410) may include a copy of the material MLP model, including the learned parameter values material MLP model. As another example, the intensity model (410) may use the output of the material MLP model as input. Thus, the intensity model is an extra one or more layers of an MLP model on the material MLP model. Namely, the intensity MLP model using the material properties to determine an intensity value.

The aggregation intensity function (412) is configured to compute an aggregated intensity for a ray. Specifically, the aggregation intensity function (412) aggregates the intensities along the sampled locations of the ray to compute a total intensity of the ray. In one or more embodiments, the aggregated intensity function is a weighted summation of the intensity, where each intensity is weighted by the alpha value described above and the accumulated transmission described in FIG. 4. For example, the aggregated intensity function may be the following function (eq. 5):

$$I(r) = \sum_{i=1}^{N} \alpha(x_i) T(x_i) i(x) \qquad \text{eq. 5}$$

In eq. 5, $T(x_i)$ is calculated using eq. 4, $\alpha(x_j)$ is the alpha value calculated in eq. 1 and i(x) is the output of the intensity model (410) at location x.

The aggregation depth function (414) is configured to compute an aggregated depth for a ray. Specifically, the aggregation depth function (414) aggregates the depths along the sampled locations of the ray to compute a total depth of the ray. A depth is a distance along the ray from the location to the virtual sensor. In one or more embodiments, the aggregated depth function is a weighted summation of the depths, where each depth is weighted by the alpha value described above and the accumulated transmission described in FIG. 4. For example, the aggregated depth function may be the following function (eq. 6):

$$D(r) = \sum_{i=1}^{N} \alpha(x_i) T(x_i) d(x) \qquad \text{eq. 6}$$

In eq. 5, $T(x_i)$ is calculated using eq. 4, $\alpha(x_j)$ is the alpha value calculated in eq. 1 and d(x) is the depth of location x.

While the above description of FIG. 4 presents specific models and functions, other models and functions may be used without departing from the scope of the claims. Further, additional models may exist and be used to reconstruct an object.

Figure 7:
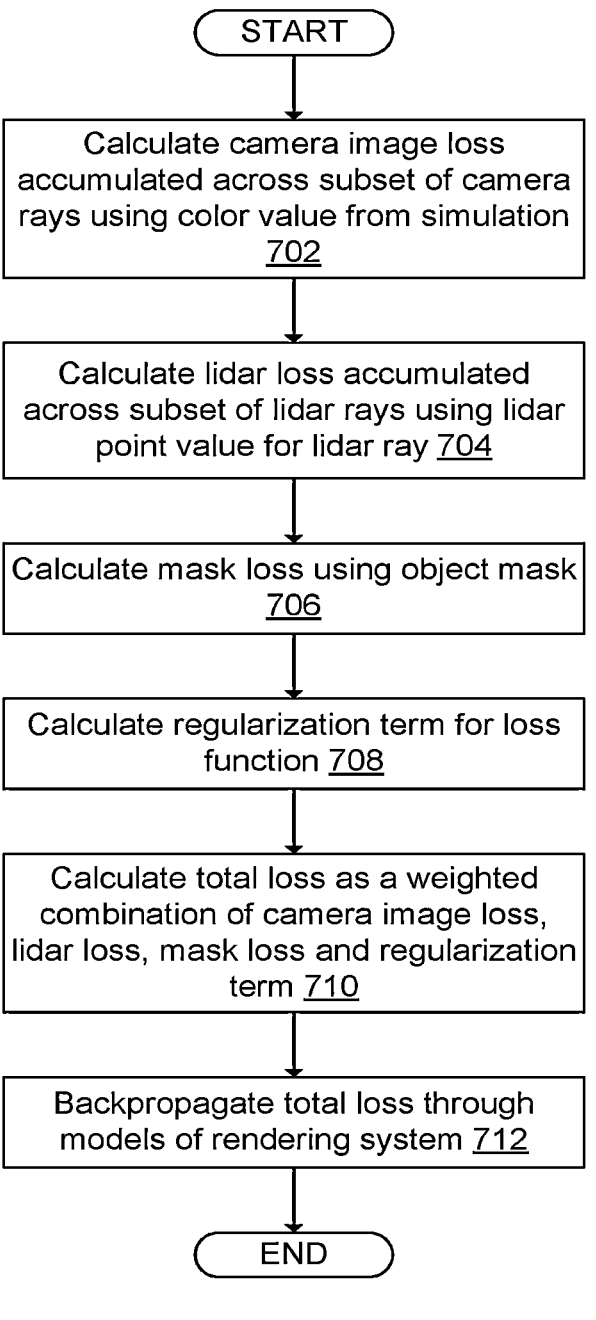
FIG. 7 shows a flowchart for training the rendering system in accordance with one or more embodiments.

FIGS. 5-7 show flowcharts in accordance with one or more embodiments. The various flowcharts may be combined. While the various steps in these flowcharts are presented and described sequentially, at least some of the steps may be executed in different orders, may be combined or omitted, and at least some of the steps may be executed in parallel. Furthermore, the steps may be performed actively or passively.

Turning to FIG. 5, FIG. 5 shows a flowchart for generating a color value for a ray in accordance with one or more embodiments. Specifically, FIG. 5 shows a flowchart for generating a color value for a ray as a virtual camera input. The operations of FIG. 5 may be repetitively performed to reconstruct the target object in a scene as viewed by the camera. Additional operations and modeling systems may be used to reconstruct additional objects and to generate a scene from the various objects.

In Block 502, the locations on a camera ray intersecting a target object are sampled. In one or more embodiments, a hierarchical sampling strategy is used that performs both coarse and fine sampling. In the hierarchical sampling, coarse sampling is performed, and the alpha values are calculated for the coarse samples to determine the position of the coarse samples with respect to the target object. Based on the positions, stratified sampling may be used to obtain a collection of samples spanning the ray. The stratified sampling may be weighted to give greater weight to positions that are close to the surface of the target object. Therefore, the weighting causes more samples that are located near the target object's surface. For example, the stratified sampling may be weighted by $T(x_i)$ multiplied $\alpha(x_j)$, where $T(x_i)$ and $\alpha(x_j)$ are the values calculated from eq. 4 and eq. 1, respectively. The result of the sampling is n samples or sample set that is size n.

Continuing with FIG. 5, a location is selected from the n samples in Block 504. In Block 506, the position of location with respect to target object is determined using NeRSDF model to determine the surface of the target object, and then calculating alpha value. For example, the surface MLP model may be used to generate the surface of the target object. The surface MLP model may be used to calculate the signed distance based on the surface. The surface MLP model provides an s(x) value that may be used to eq. 1 to calculate the alpha value, and subsequently the position.

In one or more embodiments, from a reflectance MLP model, albedo and material shininess is calculated for the location. The albedo MLP model and the material shininess MLP model are executed on the location. The albedo MLP model generates a diffuse albedo and a specular albedo through executing the various layers of the network. The material MLP model calculates the material shininess.

The radiance value for the location x and viewing direction d is computed in Block 510. In one or more embodiments, the radiance value is calculated by executing the radiance function. For example, eq. 2 may be calculated using the albedo and material shininess obtained in Block 506.

In one or more embodiments, Blocks 508 and 510 are performed for a subset of the sample set obtained in Block 502. For locations corresponding to positions that are not in the target object or on the surface of the target object, Blocks 508 and 510 may be combined by executing a single MLP network that outputs a radiance value for the location. Namely, the single MLP model is trained to generate the radiance value for the location directly rather than computing a separate radiance function. An example of the single MLP model is a neural reflectance (NeRF) model. For example, if the location is in the near background or the far background, the single MLP model may be executed on the location. An individual MLP model may be used for the near background and an individual MLP model may be used for the far background.

The result of Block 510 or using the single MLP model is a radiance value for a particular sample in the sample set. In Block 512, a determination is made whether another sample exists in the sample set. If another sample exists, the process repeats with Block 504.

If another sample does not exist, the process flows to Block 514. In Block 514, the color value is rendered by compositing the radiance across the locations along the camera ray. The radiances of the samples in the sample set are combined using the aggregation radiance function. Thus, the radiances account for viewing direction of the camera and the lighting environment. Because the MLP models are trained using actual camera images of a particular object, the result of Block 514 is a color value for a small portion of a reconstructed object in the scene that is reconstructed from the real world. By repeating FIG. 5 for each ray, the target object is reconstructed. Notably, the reconstructed target object may be from a different viewing angle than the actual camera images. Thus, the reconstruction is not a copy of an image, but a recreation of the object in the virtual world.

By combining multiple target objects, a scene may be rendered. The scene may be used to train the virtual driver, to display to a player in a gaming system, to create a movie or other multimedia content, etc.

In some embodiments, the execution of the models is computationally expensive. Thus, in some embodiments, a target object is reconstructed, and the geometry, surface texture, and material shininess are used as property values of a mesh representing the object. Marching cubes may be used to generate the mesh from the SDF representation, and volume render rays to each vertex may be used to compute the per-vertex albedo, specular albedo, and material shininess mappings. The explicit mesh may be rendered using a rendering engine that uses meshes, such as with OpenGL based rasterization engines. By using the mesh rendering for subsequent renderings, the simulation of the movement of the target object is more efficient. However, by initially reconstructing the target object using the processes described in FIG. 5, the reconstructed target object is a more accurate representation.

One or more embodiments reconstruct both camera input for the target object using FIG. 5 and lidar input. FIG. 6 shows a flowchart for generating a lidar point in accordance with one or more embodiments. The process of FIG. 6 may be repeated across the rays intersecting the target object to generate the portion of lidar image having the target object. Multiple portions for multiple objects may be combined into a lidar image.

To generate a lidar point, a lidar ray is defined. Because the virtual lidar sensor is generally located at a different location than the virtual camera sensor, the lidar rays are different than the camera rays. In Block 602, locations on the lidar ray intersecting the target object are sampled to obtain a second sample set of the locations on the lidar ray. In one or more embodiments, the sampling strategy is the same as described above with reference to Block 502 of FIG. 5. For example, a coarse set of samples may be obtained, and the corresponding positions determined. Using stratified sampling based on the coarse set that is weighted based on positions, a fine set of samples may be obtained. The result is a sample set for the lidar ray.

In Block 604, the depths are calculated for the second sample set. For each location in the sample set, the distance from the location to the virtual sensor along the ray is calculated. The calculation is a direct distance formula calculation. The result is a corresponding depth value for each location in the sample set.

In Block 606, the depth value for the lidar ray is calculated as the accumulation of the depths. The accumulation depth function may be used to calculate the depth value. The accumulation depth function weighs the depth values according to the position of the location and the accumulated transmittance.

In Block 608, the intensities are generated using the intensity model for the second sample set. For each location in the sample set, the intensity model is executed using the location as the input. In one or more embodiments, the material MLP model is executed for the location. The output of the material MLP model is the material shininess that is provided as input to the intensity layers of the intensity MLP model to generate the intensity. The result of Block 608 is a corresponding intensity value for each location in the sample set.

In Block 610, the intensity value for the lidar ray is calculated as the accumulation of the intensities. The accumulation intensity function may be used to calculate the intensity value. The accumulation intensity function weighs the intensity values according to the position of the location and the accumulated transmittance.

In Block 612, the depth value and the intensity value into a lidar point for the lidar ray. Specifically, the depth value and intensity value as a pair correspond to the lidar point value.

FIG. 7 shows a flowchart for training the rendering system in accordance with one or more embodiments. In one or more embodiments a single loss value is calculated as a combination of losses. The single loss is backpropagated through the models of the network. Loss is determined using observed values acquired from the real world of the target object. For example, a sensing vehicle driving down a street may have cameras and lidar sensors to capture various observations of the target object. During training, observed sensor data (e.g., color value or lidar point) from the same viewing direction and angle as a corresponding ray having a color value or lidar point from executing FIG. 5 or FIG. 6 is compared to the color value or lidar point of the corresponding ray. Notably, the sensor data may be incomplete. For example, when the sensing vehicle drives down the street, the sensing vehicle may view only one side of the target object. One or more embodiments may assume symmetry to identify the other side of the target object. For example, a target object that is a vehicle may be assumed symmetric along the vehicle's longitudinal axis.

Turning to FIG. 7, in Block 702, a camera image loss accumulated across a subset of camera rays is calculated using color values determined for the camera rays and sensor data for the same viewing direction and angle as the camera ray. For each camera ray, the observed color value for the target object at the same viewing direction and angle as the camera ray is obtained. The observed color value is compared to the simulated color value calculated using the operations of FIG. 5. Specifically, the difference between observed color value and the simulated color value is calculated. Averages of the differences is the camera image loss.

In Block 702, a lidar loss accumulated across a subset of lidar rays is calculated using lidar points determined for the lidar rays and sensor data for the same viewing direction and angle as the lidar ray. For each lidar ray, the observed lidar point for the target object at the same viewing direction and angle as the lidar ray is obtained. The observed lidar point is compared to the simulated color value calculated using operations of FIG. 6. Specifically, the difference between the depths in the observed lidar point value and the simulated depth in the simulated lidar point value is calculated as the depth difference. Similarly, the difference between the intensities in the observed lidar point value and the simulated intensity in the simulated lidar point value is calculated as the intensity difference. The depth difference and intensity difference are combined, such as through weighted summation to generate a total difference for the lidar point. Averages of the total differences across the lidar points is the lidar loss.

In at least some embodiments, a mask loss is calculated in Block 706 and used as part of the total loss. A simulated camera image from a scene generated using a reconstructed object is calculated. The scene is a replication of a real world image captured using a real camera. A segmentation model is executed on the simulated camera image and executed on the real world image to generate an object mask for the target object. For example, the segmentation model may be a convolutional neural network trained to label pixels of an image as the type of the target object or not belonging to the type corresponding to the target object. The result of executing the segmentation model is an object mask for the simulated camera image and an object mask for the real world image. For the simulated camera image, each location in the image has a real foreground probability or a probability of being in the foreground (i.e., part of the target object as shown in FIG. 3). The difference between the real foreground probability and the object mask for multiple camera ray to the target object is calculated. The mask loss is the average of the differences.

In at least some embodiments, a regularization term is calculated in Block 708 and used as part of the total loss. The regularization term may include a term to encourage the signed distance function to satisfy the Eikonal equation and a smoothness term encourage the reconstructed target object to be smooth. The smoothness term encourages the surface point normal to be smooth. In one or more embodiments, the regularization terms are calculated using the following function (eq. 7):

$$\mathcal{L}_{reg} = \frac{1}{N}\sum_{i=1}^{N}\sum_{j=1}^{N_i}(\|\nabla_s(x_{ij})\|_2 - 1)^2 + \frac{1}{N}\sum_{i=1}^{N}\|n(x_s) - n(x_s + \epsilon)\|_2 \quad \text{eq. 7}$$

In eq. 7, $\nabla_s$ the gradient, $s(x_{ij})$ is the predicted signed distance at location $x_{ij}$, and $n(x_s)$ is the normal at the surface point $x_s$, and $\epsilon$ is a small uniform spatial perturbation. In one or more embodiments, the regularization terms also include a symmetry loss to ensure the surface geometry and material properties to be approximately symmetric (eq. 8):

$$\mathcal{L}_{sym} = \frac{1}{N}\sum_{i=1}^{N}\|s(x_i) - s(x_i')\|_2 + \|n'(x_i) - n(x_i')\|_2 + \|a(x_i) - $$

$$a(x_i')\|_2 + \|a_s(x_i) - a_s(x_i')\|_2 + \|\gamma(x_i) - \gamma(x_i')\|_2 \quad \text{eq. 8}$$

In eq. 8, for location $x_i$ with surface normal $n_i$, the symmetrized point and surface normal are $x_i'$ and $n_i'$. And $s(x_i)$ is the predicted signed distance at location $x_i$, $a(x_i)$ is the predicted diffuse albedo at location $x_i$, $a_s(x_i)$ is the predicted specular albedo at location $x_i$, $\gamma(x_i)$ is the predicted material shininess at location $x_i$.

Continuing with FIG. 7, the total loss is calculated as a weighted combination of the camera image loss, the lidar loss, the mask loss, and the regularization term in Block 710. Each loss is weighted by a parameter for weighing the loss. The parameters are configurable.

In Block 712, the total loss is backpropagated through the models of the rendering system. Specifically, the total loss is backpropagated through the geometry model, the albedo MLP model, and the material MLP model. Thus, the shape and reflectance network models are jointly trained via gradient descent. The training may be performed using ray batches or batches of rays. The process may repetitively train using the flow of FIG. 7 to iteratively improve the rendering system.

Figure 8A:
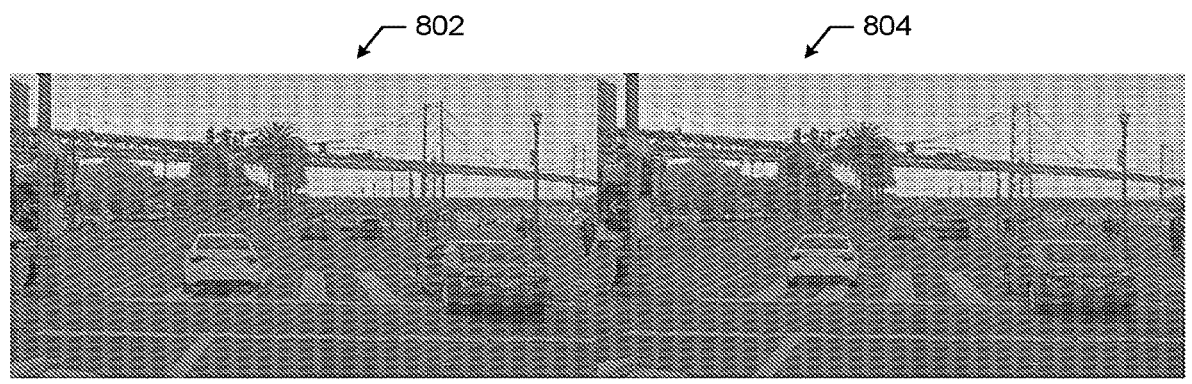
FIGS. 8A, 8B, and 8C show an example in accordance with one or more embodiments.
Figure 8B:
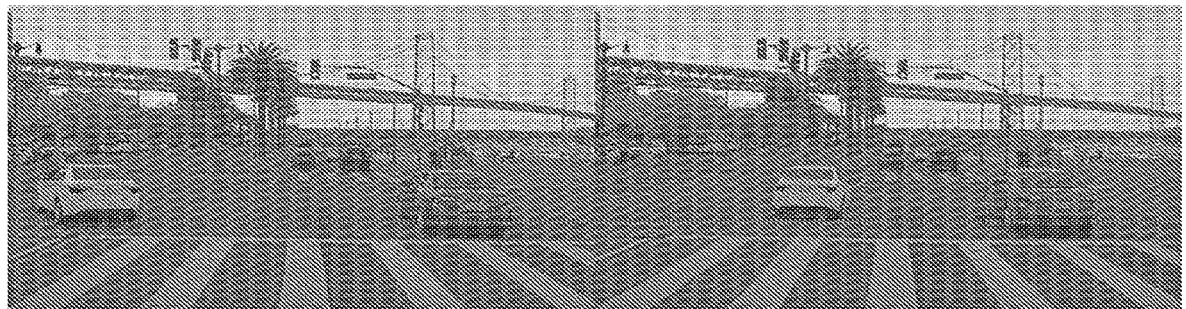
Figure 8C:
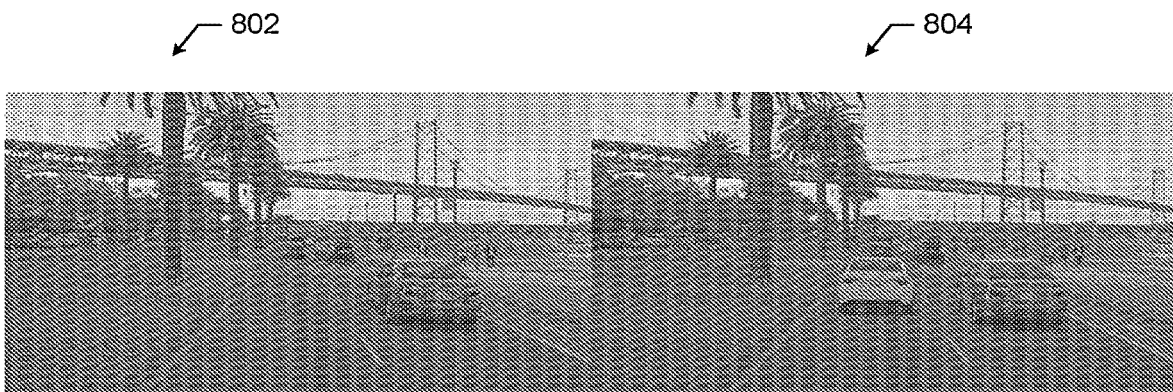

Object reconstruction according to one or more embodiments creates realistic sensor input for a mixed reality. The object reconstruction creates target objects at different angles than captured using real sensor data. For example, as shown in FIG. 8A, FIG. 8B, and FIG. 8C, the simulator can create a mixed reality world in which actor actions deviate from the real world. The left image (802) of FIG. 8A, FIG. 8B, and FIG. 8C show the real world images captured through an actual camera on the autonomous system. The right image (804) of FIG. 8A, FIG. 8B, and FIG. 8C show the mixed reality image which deviates from the actual events. As shown based on a comparison of the left images with the right images, the car (i.e., target object in the example) in front of the player makes a left hand turn in the real world while cuts in front of the player to continue straight in the simulated environment. In FIG. 8A, the car is at a different position in viewing angle in the simulated environment than in the real world. In FIG. 8B, the car is at an even greater different viewing angle. Specifically, more of the right side of the car is visible than was ever visible in the real camera images (802). In FIG. 8C, the car is added to the scene. Using embodiments of the present disclosure, camera images from the simulated mixed reality simulation is indistinguishable from the real camera images. Thus, embodiments create more realistic sensor input at the virtual sensors.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 9A, the computing system (900) may include one or more computer processors (902), non-persistent storage (904), persistent storage (906), a communication interface (912) (e.g., Bluetooth interface, infrared interface, network interface, optical interface, etc.), and numerous other elements and functionalities that implement the features and elements of the disclosure. The computer processor(s) (902) may be an integrated circuit for processing instructions. The computer processor(s) may be one or more cores or micro-cores of a processor. The computer processor(s) (902) includes one or more processors. The one or more processors may include a central processing unit (CPU), a graphics processing unit (GPU), a tensor processing units (TPU), combinations thereof, etc.

The input devices (910) may include a touchscreen, keyboard, mouse, microphone, touchpad, electronic pen, or any other type of input device. The input devices (910) may receive inputs from a user that are responsive to data and messages presented by the output devices (908). The inputs may include text input, audio input, video input, etc., which may be processed and transmitted by the computing system (900) in accordance with the disclosure. The communication interface (912) may include an integrated circuit for connecting the computing system (900) to a network (not shown) (e.g., a local area network (LAN), a wide area network (WAN) such as the Internet, mobile network, or any other type of network) and/or to another device, such as another computing device.

Further, the output devices (908) may include a display device, a printer, external storage, or any other output device. One or more of the output devices may be the same or different from the input device(s). The input and output device(s) may be locally or remotely connected to the computer processor(s) (902). Many different types of computing systems exist, and the aforementioned input and output device(s) may take other forms. The output devices (908) may display data and messages that are transmitted and received by the computing system (900). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

The computing system (900) in FIG. 9A may be connected to or be a part of a network. For example, as shown in FIG. 9B, the network (920) may include multiple nodes (e.g., node X (922), node Y (924)). Each node may correspond to a computing system, such as the computing system shown in FIG. 9A, or a group of nodes combined may correspond to the computing system shown in FIG. 9A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (900) may be located at a remote location and connected to the other elements over a network.

The nodes (e.g., node X (922), node Y (924)) in the network (920) may be configured to provide services for a client device (926), including receiving requests and transmitting responses to the client device (926). For example, the nodes may be part of a cloud computing system. The client device (926) may be a computing system, such as the computing system shown in FIG. 9A. Further, the client device (926) may include and/or perform all or a portion of one or more embodiments.

The computing system of FIG. 9A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
sampling a first plurality of locations along a camera ray from a virtual camera to a target object to obtain a first sample set of the first plurality of locations along the camera ray;
for each location of at least a subset of the first sample set:
determining a position of the location with respect to the target object,
executing, based on the position, a reflectance multilayer perceptron (MLP) model, to determine an albedo and material shininess for the location, wherein the reflectance MLP model comprises an intensity model as an extra layer on the reflectance MLP model, and wherein the intensity model generates the material shininess, wherein the extra layer generates a plurality of predicted intensities, and
computing a radiance for the location and based on a viewing direction of the camera ray using the albedo and the material shininess; and
rendering a color value for the camera ray by compositing the radiance across the first sample set.
2. The method of claim 1, further comprising:
executing geometry model to determine a surface of the target object; and
calculating a position function for a location of the first plurality of locations to determine the position of the location with respect to the surface.
3. The method of claim 2, wherein the geometry model is a surface MLP model.
4. The method of claim 1, wherein the position is one selected from a group consisting of near background, foreground, and far background.
5. The method of claim 1, wherein the reflectance MLP comprises:

an albedo MLP model that generates a diffuse albedo and a specular albedo, wherein the albedo comprises the diffuse albedo and the specular albedo, and
a material MLP model that calculates the material shininess.
6. The method of claim 1, further comprising:
sampling a second plurality of locations on a lidar ray intersecting the target object to obtain a second sample set of the second plurality of locations on the lidar ray;
calculating a plurality of depths for the second sample set;
determining a depth value for the lidar ray as an accumulation of the plurality of depths;
generating, by the intensity model, the plurality of predicted intensities for the second sample set;
determining an intensity value for the lidar ray as an accumulation of the plurality of predicted intensities; and
combining the depth value and the intensity value into a lidar point for the lidar ray.
7. A method comprising:
calculating a camera image loss accumulated across a subset of camera rays using a plurality of color values and sensor data from a camera, the subset of camera rays comprising the camera ray and the plurality of color values comprising the color value;
calculating a lidar loss accumulated across a subset of lidar rays using a plurality of lidar point values and sensor data from a lidar sensor;
generating a total loss using the camera image loss and the lidar loss;
sampling a first plurality of locations along a camera ray from a virtual camera to a target object to obtain a first sample set of the first plurality of locations along the camera ray;
for each location of at least a subset of the first sample set:
determining a position of the location with respect to the target object,
executing, based on the position, a reflectance multilayer perceptron (MLP) model, to determine an albedo and material shininess for the location, and
computing a radiance for the location and based on a viewing direction of the camera ray using the albedo and the material shininess; and
rendering a color value for the camera ray by compositing the radiance across the first sample set.
8. The method of claim 7, further comprising:
executing a segmentation model on an object image generated from the plurality of color values to generate a virtual object mask;
executing the segmentation model on a camera image to generate a real object mask; and
calculating a mask loss from the virtual object mask and the real object mask,
wherein the total loss is further generated using the mask loss.
9. The method of claim 7, further comprising:
generating a regularization term based on a regularization function,
wherein the total loss further is generated further using the regularization term.
10. The method of claim 7, wherein the total loss is a weighted combination of the camera image loss, the lidar loss, a mask loss, and a regularization term.
11. The method of claim 7, further comprising:
backpropagating the total loss through a geometry model, an albedo MLP model, and a material MLP model, wherein the reflectance MLP model comprises the albedo MLP model and the material MLP model.

12. A system comprising:

memory; and a computer processor comprising computer readable program code for performing operations comprising:

sampling a first plurality of locations along a camera ray from a virtual camera to a target object to obtain a first sample set of the first plurality of locations along the camera ray, for each location of at least a subset of the first sample set:

determining a position of the location with respect to the target object, executing, based on the position, a reflectance multilayer perceptron (MLP) model, to determine an albedo and material shininess for the location, wherein the reflectance MLP model comprises an intensity model as an extra layer on the reflectance MLP model, and wherein the intensity model generates the material shininess, wherein the extra layer generates a plurality of predicted intensities, and computing a radiance for the location and based on a viewing direction of the camera ray using the albedo and the material shininess, and rendering a color value for the camera ray by compositing the radiance across the first sample set.

13. The system of claim 12, wherein the operations further comprise:

executing geometry model to determine a surface of the target object; and calculating a position function for a location of the first plurality of locations to determine the position of the location with respect to the surface.

14. The system of claim 12, wherein the position is one selected from a group consisting of near background, foreground, and far background.

15. The system of claim 12, wherein the reflectance MLP comprises:

an albedo MLP model that generates a diffuse albedo and a specular albedo, wherein the albedo comprises the diffuse albedo and the specular albedo, and a material MLP model that calculates the material shininess.

16. The system of claim 12, wherein the operations further comprise:

sampling a second plurality of locations on a lidar ray intersecting the target object to obtain a second sample set of the second plurality of locations along the lidar ray;

calculating a plurality of depths for the second sample set;

determining a depth value for the lidar ray as an accumulation of the plurality of depths;

generating, by the intensity model, the plurality of predicted intensities for the second sample set;

determining an intensity value for the lidar ray as an accumulation of the plurality of predicted intensities; and combining the depth value and the intensity value into a lidar point for the lidar ray.

17. A system comprising:

memory; and a computer processor comprising computer readable program code for performing operations comprising:

calculating a camera image loss accumulated across a subset of camera rays using a plurality of color values and sensor data from a camera, the subset of camera rays comprising the camera ray and the plurality of color values comprising the color value, calculating a lidar loss accumulated across a subset of lidar rays using a plurality of lidar point values and sensor data from a lidar sensor, generating a total loss using the camera image loss and the lidar loss, sampling a first plurality of locations along a camera ray from a virtual camera to a target object to obtain a first sample set of the first plurality of locations along the camera ray, for each location of at least a subset of the first sample set:

determining a position of the location with respect to the target object, executing, based on the position, a reflectance multilayer perceptron (MLP) model, to determine an albedo and material shininess for the location, and computing a radiance for the location and based on a viewing direction of the camera ray using the albedo and the material shininess, and rendering a color value for the camera ray by compositing the radiance across the first sample set.

18. A non-transitory computer readable medium comprising computer readable program code for performing operations comprising:

sampling a first plurality of locations along a camera ray from a virtual camera to a target object to obtain a first sample set of the first plurality of locations along the camera ray;

for each location of at least a subset of the first sample set:

determining a position of the location with respect to the target object, executing, based on the position, a reflectance multilayer perceptron (MLP) model, to determine an albedo and material shininess for the location, wherein the reflectance MLP model comprises an intensity model as an extra layer on the reflectance MLP model, and wherein the intensity model generates the material shininess, wherein the extra layer generates a plurality of predicted intensities, and computing a radiance for the location and based on a viewing direction of the camera ray using the albedo and the material shininess; and rendering a color value for the camera ray by compositing the radiance across the first sample set.

* * * * *